(12) United States Patent
Lee et al.

(10) Patent No.: US 10,136,206 B2
(45) Date of Patent: Nov. 20, 2018

(54) DEVICE FOR OUTPUTTING AUDIO SIGNAL AND METHOD FOR OUTPUTTING AUDIO SIGNAL

(71) Applicant: SAMSUNG ELECTRONICS CO., LTD., Suwon-si (KR)

(72) Inventors: Kang-eun Lee, Hwaseong-si (KR); Tae-hyun Yoon, Suwon-si (KR); Byeong-yong Jeon, Suwon-si (KR); Hyeon-seong Kim, Seoul (KR); Seong-hyeon Choe, Daegu (KR); Hyun-chul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/516,297

(22) PCT Filed: Aug. 5, 2015

(86) PCT No.: PCT/KR2015/008198
§ 371 (c)(1),
(2) Date: Mar. 31, 2017

(87) PCT Pub. No.: WO2017/022873
PCT Pub. Date: Feb. 9, 2017

(65) Prior Publication Data
US 2017/0311063 A1   Oct. 26, 2017

(51) Int. Cl.
*H04R 1/02* (2006.01)
*G04G 21/06* (2010.01)
(Continued)

(52) U.S. Cl.
CPC ............ *H04R 1/028* (2013.01); *G04G 21/06* (2013.01); *H04M 19/04* (2013.01); *H04R 1/04* (2013.01);
(Continued)

(58) Field of Classification Search
CPC . H04R 1/028; H04R 1/04; H04R 3/04; H04R 29/00; H04R 2400/03;
(Continued)

(56) References Cited

U.S. PATENT DOCUMENTS 5,337,364 A  *  8/1994  Fitch ..................... A61F 11/04
                                                    340/407.1
7,536,020 B2    5/2009  Fukumoto et al.
(Continued)

FOREIGN PATENT DOCUMENTS

EP       0 951 883 B1   7/2005
JP       2013-38455 A   2/2013
(Continued)

OTHER PUBLICATIONS

Communication dated Apr. 29, 2016 issued by the International Searching Authority in counterpart International Patent Application No. PCT/KR2015/008198 (PCT/ISA/220/210/237).
(Continued)

*Primary Examiner* — Jason R Kurr
(74) *Attorney, Agent, or Firm* — Sughrue Mion, PLLC (57) ABSTRACT

Provided is a device for outputting an audio signal. The device includes: a vibrator configured to output the audio signal; a vibrator cover provided on the vibrator to transmit the output audio signal to a surface of an object mounted with the device; a sensor configured to measure a pressure between the surface of the object and the vibrator cover; a distance adjusting unit configured to adjust a distance between the surface of the object and the vibrator cover based on the pressure measured by the sensor to optimally output the audio signal; and a control unit configured to control the vibrator, the sensor, and the distance adjusting unit.

16 Claims, 9 Drawing Sheets

(51) Int. Cl.
*H04R 1/04* (2006.01)
*H04R 3/04* (2006.01)
*H04R 29/00* (2006.01)
*H04M 19/04* (2006.01)

(52) U.S. Cl.
CPC ............... *H04R 3/04* (2013.01); *H04R 29/00* (2013.01); *H04R 2400/03* (2013.01); *H04R 2460/13* (2013.01); *H04R 2499/11* (2013.01)

(58) Field of Classification Search
CPC ............ H04R 2460/13; H04R 2499/11; G04G 21/06; H04M 19/04
See application file for complete search history.

(56) References Cited

U.S. PATENT DOCUMENTS

| | | | |
|---|---|---|---|
| 9,477,208 B2 | 10/2016 | Lee et al. | |
| 9,860,622 B2* | 1/2018 | Wong | H04R 1/028 |
| 2010/0316235 A1 | 12/2010 | Park et al. | |
| 2014/0321654 A1 | 10/2014 | Kim et al. | |
| 2015/0015502 A1 | 1/2015 | Al-Nasser | |
| 2015/0154853 A1 | 6/2015 | Yousef et al. | |
| 2016/0142818 A1 | 5/2016 | Park | |
| 2016/0212547 A1 | 7/2016 | Kang | |
| 2016/0261299 A1* | 9/2016 | Hosoi | G06F 1/163 |

FOREIGN PATENT DOCUMENTS

| | | |
|---|---|---|
| KR | 10-2008-0069400 A | 7/2008 |
| KR | 20-0473207 Y1 | 6/2014 |
| KR | 10-2014-0126027 A | 10/2014 |
| KR | 10-1467500 B1 | 12/2014 |
| KR | 10-2015-0065071 A | 6/2015 |
| KR | 10-2016-0059222 A | 5/2016 |

OTHER PUBLICATIONS

Communication dated Mar. 10, 2017 issued by the Korean Intellectual Property Office in counterpart Korean Patent Application No. 10-2016-7036383.

Communication dated Jul. 17, 2017 by the Korean Intellectual Property Office in counterpart Korean Patent Application No. 10-2016-7036383.

* cited by examiner

TOUCH EAR

420

TOUCH EARHOLE

430

TOUCH FACE

DEVICE FOR OUTPUTTING AUDIO SIGNAL AND METHOD FOR OUTPUTTING AUDIO SIGNAL

TECHNICAL FIELD

The inventive concept relates to a device for outputting an audio signal and a method for processing and outputting an audio signal. In particular, the inventive concept relates to a device for outputting an audio signal through a surface of a body and a method for processing and outputting an audio signal output through a surface of a body.

BACKGROUND ART

A person may hear a sound by an air conduction method or a bone conduction method. According to the bone conduction method, a sound may be transmitted through a skull to a cochlea and then transmitted through an auditory nerve to a brain. Since a sound vibration applied to a skin surface around an ear may be directly transmitted to a cochlea through a skull instead of through the air, a hearer may hear a sound while having a minimized sound leaking to the outside.

A wearable device such as a smart watch or a smart ring may be used while being attached to a body surface of a user. According to the bone conduction method, the user may hear a sound vibration, which is output by the wearable device to a skin surface of the user, through his skull.

DETAILED DESCRIPTION OF THE INVENTION

Technical Problem

The inventive concept is to provide a device for outputting an audio signal in an optimal state through a surface of an object. Also, the inventive concept relates to a method for processing an audio signal to output an audio signal in an optimal state through a surface of an object.

Technical Solution

According to an exemplary embodiment, a device for outputting an audio signal includes: a vibrator configured to output the audio signal; a vibrator cover provided on the vibrator to transmit the output audio signal to a surface of an object mounted with the device; a sensor configured to measure a pressure between the surface of the object and the vibrator cover; a distance adjusting unit configured to adjust a distance between the surface of the object and the vibrator cover based on the pressure measured by the sensor to optimally output the audio signal; and a control unit configured to control the vibrator, the sensor, and the distance adjusting unit.

In addition, the control unit may preprocess the audio signal based on a pressure value measured by the sensor to optimally output the audio signal, and the vibrator may output the audio signal preprocessed by the control unit.

In addition, the device may further include a microphone configured to receive an audio signal of a previous frame output by the vibrator, wherein the control unit may analyze a characteristic of the received audio signal of the previous frame and preprocess an audio signal of a current frame based on the analyzed characteristic of the audio signal of the previous frame to optimally output the audio signal of the current frame, and the vibrator may output the audio signal of the current frame preprocessed by the control unit.

In addition, the microphone may receive the audio signal of the previous frame output by the vibrator through the surface of the object.

In addition, the distance adjusting unit may adjust a distance between the surface of the object and the device by lifting the device on the surface of the object or inside the device.

In addition, the distance adjusting unit may include a strap wound on the surface of the object, and the distance adjusting unit may adjust the distance between the surface of the object and the vibrator cover by winding the strap or by adjusting a length of the strap.

In addition, the vibrator cover may include a material that is capable of maintaining a predetermined distance between the surface of the object and the device when the device is attached to the surface of the object.

In addition, the device may further include a vibrator support provided on an opposite side in an output direction of the audio signal with respect to the vibrator and configured to support the vibrator while having a minimized contact area with the vibrator.

According to an exemplary embodiment, a method for outputting an audio signal from a device includes: receiving an audio signal of a previous frame output by the device through a surface of an object mounted with the device; analyzing a characteristic of the received audio signal of the previous frame; preprocessing an audio signal of a current frame based on the analyzed characteristic of the audio signal of the previous frame to optimally output the audio signal of the current frame; and outputting the preprocessed audio signal of the current frame.

In addition, the preprocessing of the audio signal may include: acquiring a reference value about the output audio signal of the previous frame; acquiring a difference value between the reference value and a value representing the analyzed characteristic of the audio signal of the previous frame; and preprocessing the audio signal of the current frame based on the difference value.

In addition, the preprocessing of the audio signal may include: acquiring an input audio signal corresponding to the output audio signal of the previous frame; acquiring a characteristic of the input audio signal; acquiring a difference between the characteristic of the input audio signal and the characteristic of the audio signal of the previous frame; and preprocessing the audio signal of the current frame based on the acquired difference.

In addition, the method may further include adjusting a distance between the surface of the object and the device based on the analyzed characteristic of the audio signal of the previous frame to optimally output the audio signal of the current frame.

BEST MODE

Hereinafter, exemplary embodiments of the inventive concept will be described in detail with reference to the accompanying drawings. However, in the following description, well-known functions or configurations are not described in detail since they would obscure the subject matters of the inventive concept in unnecessary detail. Also, like reference numerals may denote like elements throughout the specification and drawings.

The terms or words used in the following description and claims are not limited to the general or bibliographical meanings, but are merely used by the inventor to enable a clear and consistent understanding of the inventive concept. Thus, since the embodiments described herein and the configurations illustrated in the drawings are merely exemplary embodiments of the inventive concept and do not represent all of the inventive concept, it will be understood that there may be various equivalents and modifications thereof.

In the accompanying drawings, some components may be exaggerated, omitted, or schematically illustrated, and the size of each component may not completely reflect an actual size thereof. The scope of the inventive concept is not limited by the relative sizes or distances illustrated in the accompanying drawings.

Throughout the specification, when something is referred to as "including" a component, another component may be further included unless specified otherwise. Also, when an element is referred to as being "connected" to another element, it may be "directly connected" to the other element or may be "electrically connected" to the other element with one or more intervening elements therebetween.

Also, the term "unit" used herein may refer to a software component or a hardware component such as a field-programmable gate array (FPGA) or an application-specific integrated circuit (ASIC), and the "unit" may perform certain functions. However, the term "unit" is not limited to software or hardware. The "unit" may be configured so as to be in an addressable storage medium, or may be configured so as to operate one or more processors. Thus, for example, the "unit" may include components, such as software components, object-oriented software components, class components, and task components, processes, functions, attributes, procedures, subroutines, segments of program codes, drivers, firmware, microcodes, circuits, data, databases, data structures, tables, arrays, and variables. A function provided by the components and "units" may be associated with the smaller number of components and "units", or may be divided into additional components and "units".

Hereinafter, exemplary embodiments of the inventive concept will be described in detail with reference to the accompanying drawings so that those of ordinary skill in the art may easily implement the exemplary embodiments.

However, the exemplary embodiments may have different forms and should not be construed as being limited to the descriptions set forth herein. In addition, portions irrelevant to the description of the exemplary embodiments will be omitted in the drawings for a clear description of the exemplary embodiments, and like reference numerals will denote like elements throughout the specification.

Hereinafter, exemplary embodiments of the inventive concept will be described with reference to the accompanying drawings.

Figure 1:
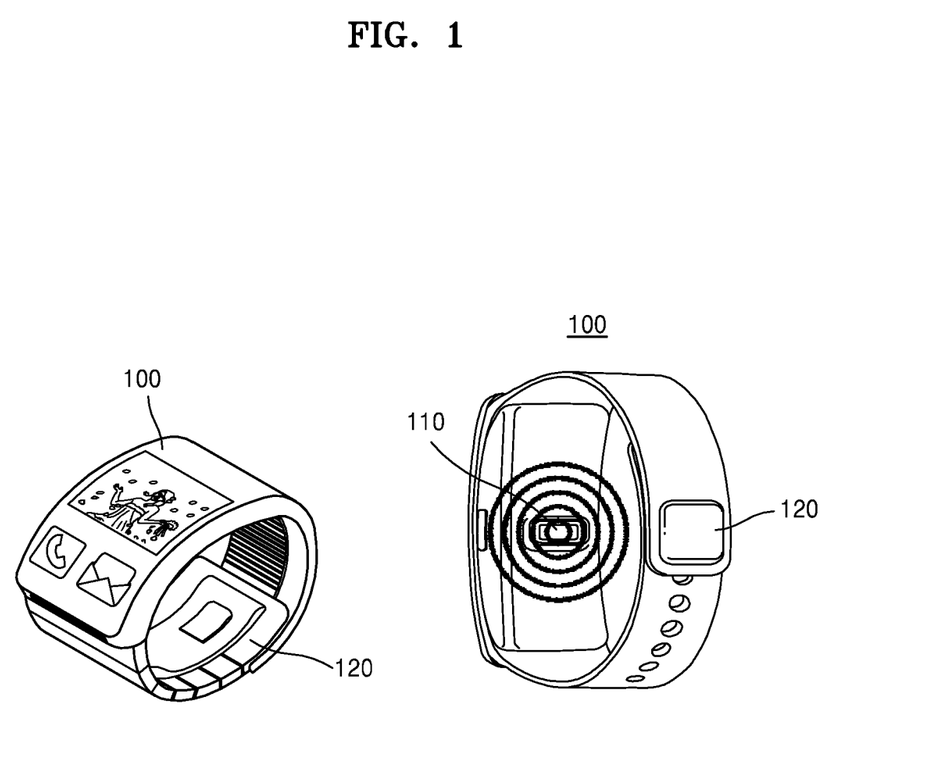
FIG. 1 is an exemplary diagram illustrating an example of a device according to an exemplary embodiment.

FIG. 1 is an exemplary diagram illustrating an example of a device according to an exemplary embodiment.

Referring to FIG. 1, a device 100 may be a smart watch as illustrated. However, the device 100 is not limited thereto and may be any device that may be used by being attached to a body of a user. For example, the device 100 may include a wearable device, such as a smart ring, a smart band, or smart glasses, an acoustic device, and a smart phone that may be attached to the body of the user to output an audio signal.

The device 100 according to an exemplary embodiment may be used by being attached to a body surface of the user, but is not limited thereto and may be used by being attached to a surface of any object. Hereinafter, for convenience of description, it is assumed that the device 100 is used by being attached to the body surface of the user.

The device 100 may include a strap 120 so that the device 100 may be attached to the body of the user by winding the strap 120 on a wrist of the user. However, the device 100 is not limited thereto and may be attached to any body part of the user according to the shape and size of the device 100. For example, the device 100 may be attached to a hand, a back of a hand, a finger, a fingernail, or a fingertip.

The device 100 may include a sound output unit 110 on a side that may contact the body of the user. The device 100 attached to the body of the user may output an audio signal through the sound output unit 110. The sound output unit 110 may include a vibrator that may generate a sound vibration corresponding to an audio signal. An audio signal may be output by the vibrator generating a sound vibration. A sound vibration output by the vibrator may be transmitted through the body surface of the user to an ear of the user, so that the user may hear an audio signal.

The sound vibration may be transmitted to the user through the body surface or a skull of the user without being transmitted through the air. The device 100 may transmit a sound to the user by the bone conduction method instead of by the air conduction method. The sound vibration generated by the vibrator may be transmitted to the user through the body surface of the user instead of through the air.

In addition to the vibrator, the sound output unit 110 of the device 100 may further include at least one component through which the sound vibration generated by the vibrator may be better transmitted to the user. For example, the sound output unit 110 may further include a vibrator cover for covering the vibrator and a vibrator support for increasing the directivity of the sound vibration.

Hereinafter, an internal structure of the sound output unit 110 of the device 100 will be described in detail with reference to FIG. 2.

Figure 2:
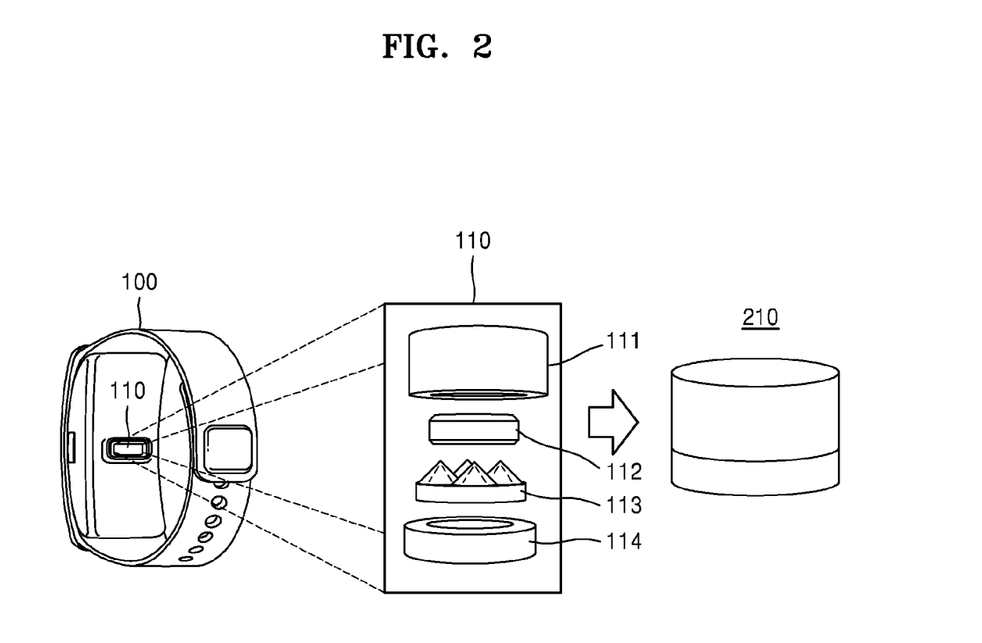
FIG. 2 is an exemplary diagram illustrating an example of an internal structure of a sound output unit 110 of a device 100, according to an exemplary embodiment.

FIG. 2 is an exemplary diagram illustrating an example of the internal structure of the sound output unit 110 of the device 100, according to an exemplary embodiment.

Referring to FIG. 2, the sound output unit 110 may include a vibrator cover 111, a vibrator 112, a vibrator support 113, and a support cover 114.

The vibrator cover 111 may protect the vibrator 112 by covering the side and top of the vibrator 112. Also, the vibrator cover 111 may transmit a sound vibration generated by the vibrator 112 to the body surface of the user. The sound vibration may be output in an optimal state when a predetermined distance is maintained between the body surface of the user and the vibrator cover 111.

When a sound vibration is transmitted from one medium to another medium of a different material, only when a vibration may be generated in each medium due to the sound vibration and a proper distance may be maintained between the mediums to transmit the sound vibration, the amount of a sound vibration lost in the transmission process may be minimized. When the distance between the mediums is too small, since the vibration in each medium due to the sound vibration may be disturbed, the sound vibration may not be properly transmitted between the mediums. Also, when the distance between the mediums is too large, since the sound vibration may be transmitted through the mediums instead of through the air, the transmission of the sound vibration between the mediums may be difficult. The sound vibration may be transmitted through a solid or liquid medium except the air.

The sound vibration generated by the vibrator 112 may be transmitted through the vibrator cover 111 to the body surface of the user. Thus, the distance between the vibrator 112 and the vibrator cover 111 and the distance between the body surface of the user and the vibrator cover 111 may be properly maintained to optimally transmit the sound vibration.

The vibrator cover 111 may include a material that may maintain a certain distance between the body surface and the vibrator 112. For example, the vibrator cover 111 may include a hard silicon material that may maintain a predetermined distance from a skin surface of the user. However, the vibrator cover 111 is not limited thereto and may include any material that may maintain a predetermined distance between the skin surface of the user and the vibrator 112.

The vibrator 112 may convert an audio signal into a sound vibration and output the sound vibration. The sound vibration generated by the vibrator 112 may be output toward the body surface of the user. When the sound vibration generated by the vibrator 112 is output through a path other than the body surface of the user, the sound vibration may leak to the outside to cause user privacy invasion and noise damage to other persons. Thus, in order to prevent the outside leakage of the sound vibration generated by the vibrator 112, the sound output unit 110 may further include the vibrator support 113 and the support cover 114.

The area of the vibrator support 113 on the side contacting the vibrator 112 may be minimized so that the sound vibration generated by the vibrator 112 may not leak in an opposite direction to the side contacting the body surface. Since the contact area with the vibrator 112 generating the sound vibration is minimized, the amount of a sound vibration leaking to the outside after transmission to the vibrator support 113 may be minimized. On the other hand, the area of the vibrator support 113 on the side not contacting the vibrator 112 may be relatively large for stable support of the vibrator 112, unlike the side contacting the vibrator 112. For example, as for the vibrator support 113, the side contacting the vibrator 112 may have a smaller area, and the opposite side thereof may have a larger area and have the shape of a cone, a triangular pyramid, a diamond, or the like.

The support cover 114 may be located at a lower end of the vibrator support 113 to cover the vibrator support 113. The support cover 114 may be filled with a soundproofing material so that the sound vibration generated by the vibrator 112 may not leak outside the support cover 114.

210 of FIG. 2 represents an example of a structure of a combination of the vibrator cover 111, the vibrator 112, the vibrator support 113, and the support cover 114. The vibrator cover 111 and the support cover 114 may be formed to cover the side surfaces and the front and rear surfaces of the vibrator 112 and the vibrator support 113 respectively.

Figure 3:
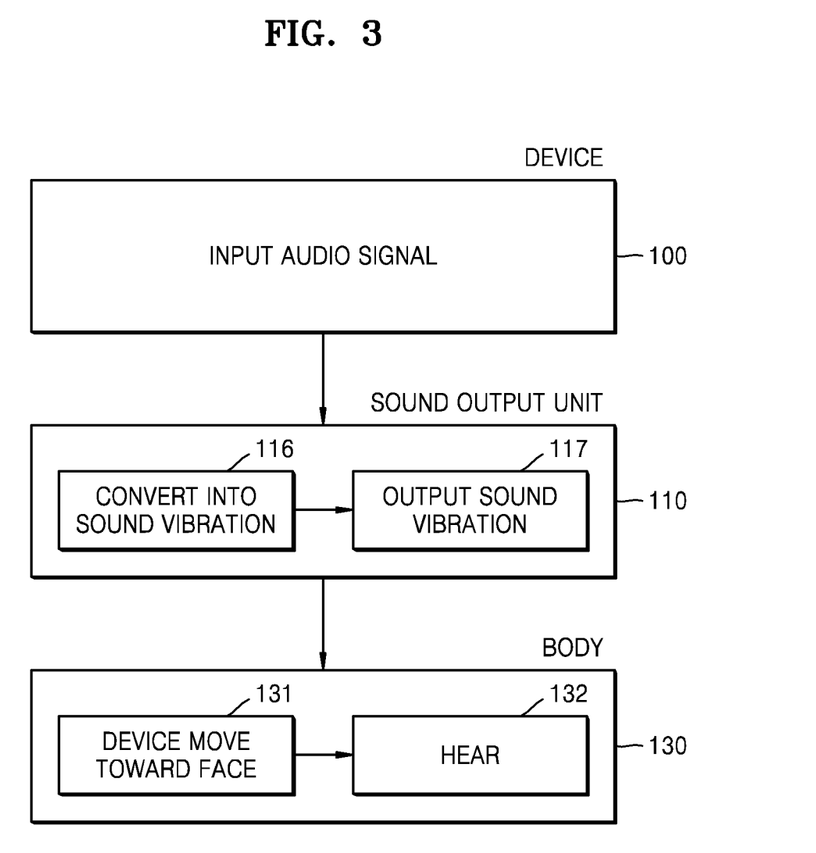
FIG. 3 is an exemplary diagram illustrating an example of a process for transmitting an audio signal of a device, according to an exemplary embodiment.

FIG. 3 is an exemplary diagram illustrating an example of a process for transmitting an audio signal of a device, according to an exemplary embodiment.

Referring to FIG. 3, when an audio signal to be output by the device 100 is input, the sound output unit 110 may convert the input audio signal into a sound vibration (116). The sound vibration may be output through the sound output unit 110 (117). The output sound vibration may be transmitted through the vibrator cover 111 to the body surface of the user.

The vibrator cover 111 may be configured to well transmit the sound vibration to the body surface of the user. For example, the vibrator cover 111 may include a material that may maintain a certain distance from the body surface of the user.

When the device 100 including the sound output unit 110 moves toward a face of the user (131), the output sound vibration may be transmitted through the skull to the user and the user may hear an audio signal (132).

The sound output unit 110 may further include the vibrator support 113 and the support cover 114 so that the sound vibration generated by the vibrator may not leak in the opposite direction to the body direction of the user. Thus, since the sound vibration leaking to the outside may be minimized, the sound vibration may be transmitted in an optimal state to the user through the body surface of the user.

Figure 4:
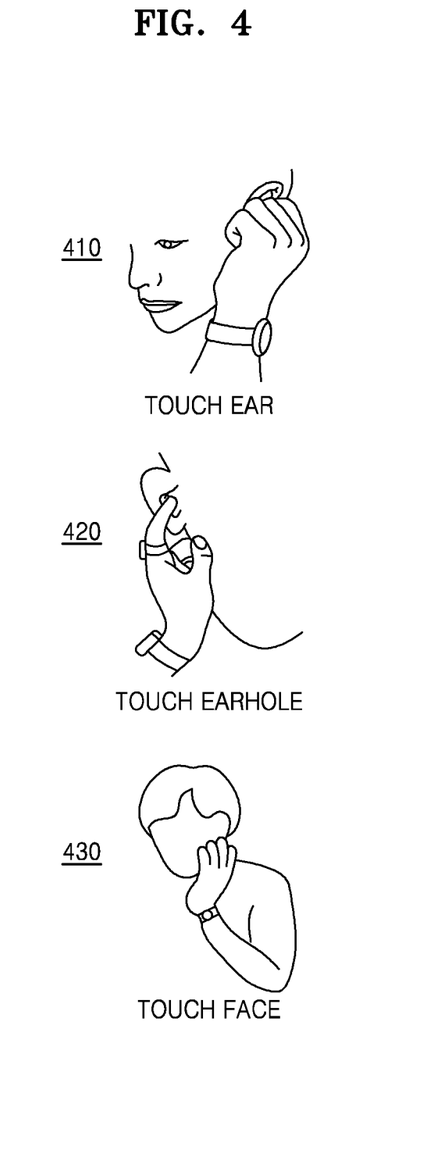
FIG. 4 is an exemplary diagram illustrating an example of a user's posture for hearing an audio signal, according to an exemplary embodiment.

FIG. 4 is an exemplary diagram illustrating an example of a user's posture for hearing an audio signal, according to an exemplary embodiment.

410 to 430 of FIG. 4 represent an example of a user's posture for hearing a sound vibration through the skull.

Referring to 410 of FIG. 4, the user may hear an audio signal by touching an ear with a hand mounted with the sound output unit 110 outputting a sound vibration. The sound vibration output by the sound output unit 110 may be transmitted through the hand to the ear, so that the user may hear an audio signal. Since the sound vibration may be transmitted better through the body surface or the skull than through the air, the user may take a posture for transmitting the sound vibration through his body to his ear.

Referring to 420 of FIG. 4, the user may hear an audio signal by touching an earhole with a finger mounted with the sound output unit 110 outputting a sound vibration. The sound vibration output by the sound output unit 110 may be transmitted through the finger and the earhole to the user, so that the user may hear an audio signal.

Referring to 430 of FIG. 4, the user may hear an audio signal by touching a face with a hand mounted with the sound output unit 110 outputting a sound vibration. The sound vibration output by the sound output unit 110 may be transmitted through the hand and the face to the skull. The user may hear an audio signal by sensing the sound vibration transmitted through the skull.

Figure 5:
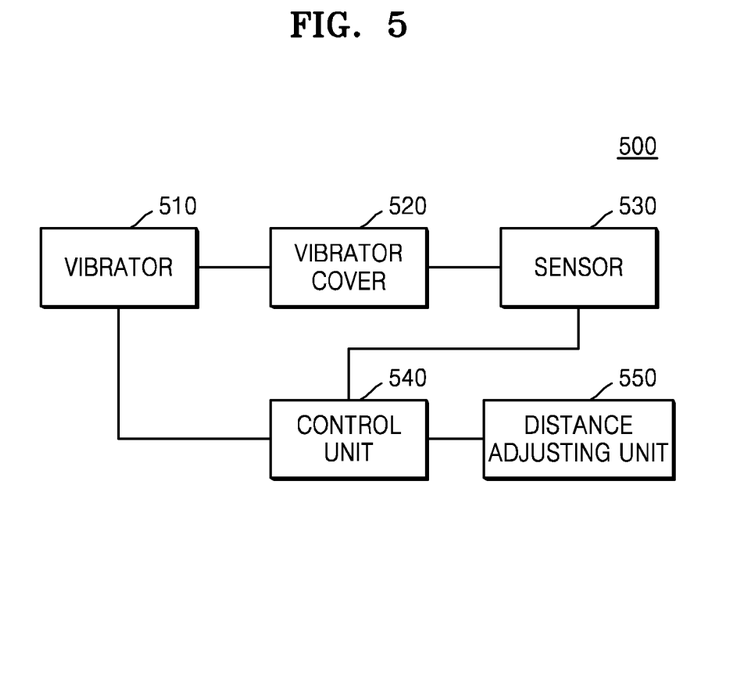
FIG. 5 is a block diagram illustrating an internal structure of a device according to an exemplary embodiment.

FIG. 5 is a block diagram illustrating an internal structure of a device according to an exemplary embodiment.

Referring to FIG. 5, a device 500 may include a vibrator 510, a vibrator cover 520, a sensor 530, a control unit 540, and a distance adjusting unit 550.

The vibrator 510 may output an audio signal. In detail, the vibrator 510 may convert an audio signal, which is to be output by the device 500, into a sound vibration and output the sound vibration. The user may hear an audio signal by the bone conduction method. The sound vibration output by the vibrator 510 may be transmitted to the user through the skin surface and the skull of the user.

The vibrato cover 520 may be provided on the vibrator 510 to transmit the audio signal (i.e., the sound vibration) output from the vibrator 510 to the skin surface of the user mounted with the device 500. It is important to maintain a certain distance between the vibrator cover 520 and the skin surface of the user so that the sound vibration output from the vibrator 510 may be transmitted to the user while having an optimal sound quality and volume. When a predetermined distance is not maintained between the vibrator cover 520 and the skin surface of the user, the sound quality and volume of the sound vibration transmitted to the user may be degraded. Thus, the vibrator cover 520 may include a material that may maintain a certain distance from the skin surface of the user. Also, the distance between the vibrator cover 520 and the skin surface of the user may be adjusted by the distance adjusting unit 550 so that the distance may be maintained to be constant.

The sensor 530 may include a pressure sensor for measuring a pressure between the device 500 and the skin surface of the user. The distance between the device 500 and the skin surface of the user may be estimated based on the pressure between the device 500 and the skin surface of the user. For example, as the pressure measured by the sensor 530 increases, the distance between the device 500 and the skin surface of the user decreases. According to the pressure measured by the sensor 530, the device 500 may adjust the distance between the device 500 and the skin surface of the user to maintain a predetermined distance between the device 500 and the skin surface of the user. The sensor 530 is not limited to the pressure sensor and may further include any sensor that may measure the distance between the device 500 and the skin surface of the user.

The control unit 540 may preprocess the audio signal based on the pressure value measured by the sensor 530 to optimally output the audio signal. For example, the control unit 540 may preprocess the audio signal based on the distance between the device 500 and the skin surface of the user, to which the sound vibration is to be transmitted.

The control unit 540 may preprocess the audio signal by considering that the sound quality and volume of the sound vibration may be degraded when a predetermined distance is not maintained between the device 500 and the skin surface of the user. According to the distance between the device 500 and the skin surface of the user, the control unit 540 may preprocess the audio signal to increase the volume of the sound vibration.

Also, based on the pressure value measured by the sensor 530, the control unit 540 may control the distance adjusting unit 550 to adjust the distance between the device 500 and the skin surface of the user to optimally output the audio signal. The distance adjusting unit 550 may adjust the distance between the device 500 and the skin surface of the user by using a strap or a lifting unit in the device 500.

The distance adjusting unit 550 may adjust the distance between the device 500 and the skin surface of the user under the control of the control unit 540. The distance adjusting unit 550 may adjust the distance by using a strap or a lifting unit provided inside or outside the device 500. By winding the strap on the skin surface of the user, the device 500 may be attached to the skin surface of the user. Since the distance between the device 500 and the skin surface may decrease as the strap is tightened, the device 500 may adjust the distance by using the strap.

The lifting unit may be located inside or outside the device 500 to lift the device 500 to adjust the distance between the device 500 and the skin surface of the user. Also, the distance between the device 500 and the skin surface of the user may be adjusted by winding the strap or adjusting the length of the strap under the control of the control unit 540. The strap may include a material that may adjust the length of the strap under the control of the control unit 540.

A method of adjusting the distance by the distance adjusting unit 550 will be described below in detail with reference to FIG. 6.

Figure 6:
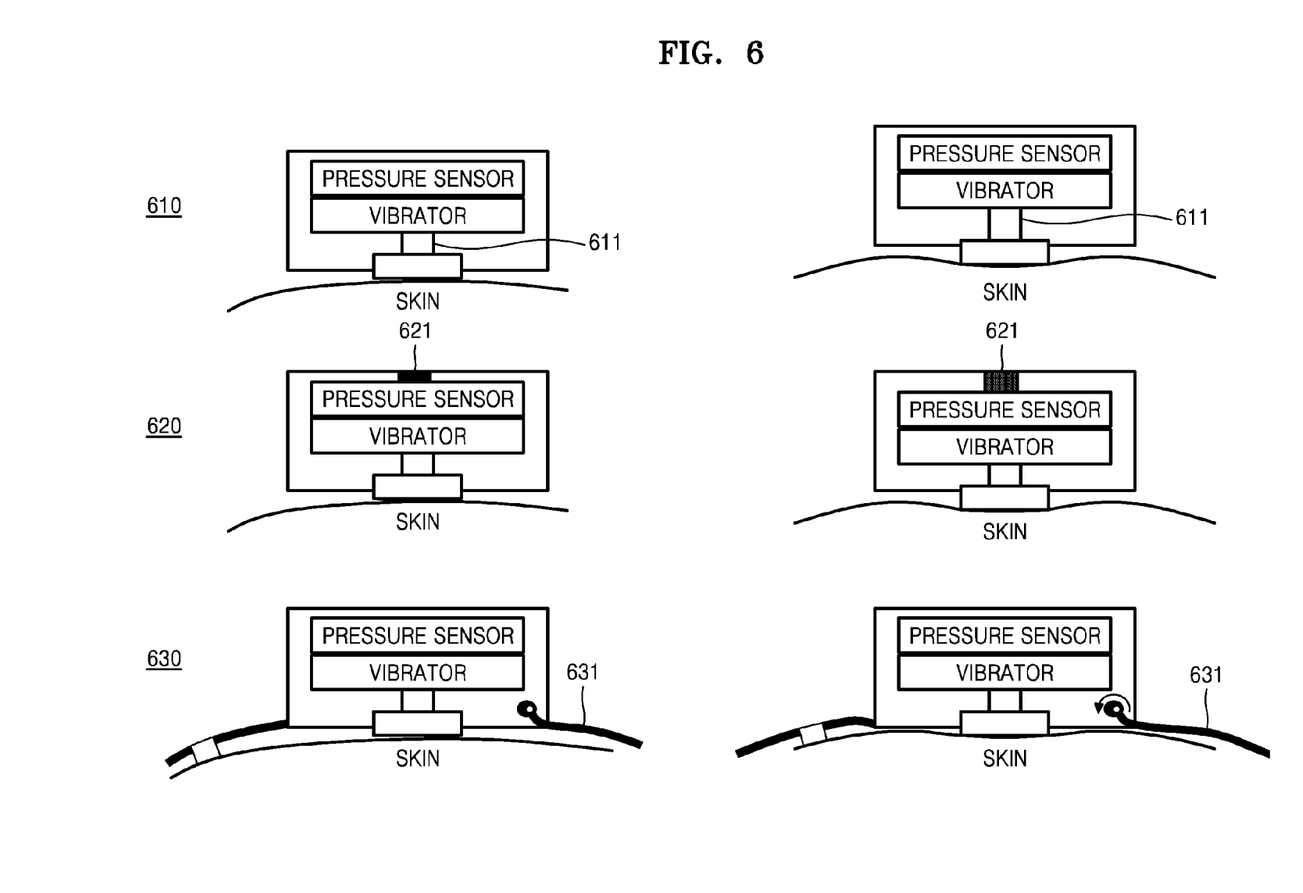
FIG. 6 is an exemplary diagram illustrating an example of adjusting a distance between a skin and a device, according to an exemplary embodiment.

FIG. 6 is an exemplary diagram illustrating an example of adjusting the distance between the skin and the device 500, according to an exemplary embodiment.

Referring to 610 and 620 of FIG. 6, lifting units 611 and 621 may be located in the device 500 and may be lifted to adjust the distance between the device 500 and the skin surface mounted with the device 500. As illustrated in 610 and 620 of FIG. 6, when the lifting units 611 and 621 are lifted while contacting the vibrator 510 or the sensor 530, the pressure between the device 500 and the skin may increase and thus the distance between the device 500 and the skin may decrease.

Referring to 630 of FIG. 6, the device 500 may adjust the distance between the device 500 and the skin by winding a strap 631. Also, the device 500 may adjust the distance between the device 500 and the skin by adjusting the length of the strap 631. The strap 631 may include a material the length of which may be adjusted by the device 500. The distance between the device 500 and the skin may be reduced by winding the strap 631 or reducing the length of the strap 631.

The distance adjusting unit 550 of the device 500 may include at least one of the exemplary configurations illustrated in 610 to 630 of FIG. 6. The distance adjusting unit 550 may adjust the distance between the device 500 and the skin by including at least one of the lifting units 611 and 621 and the strap 631.

Figure 7:
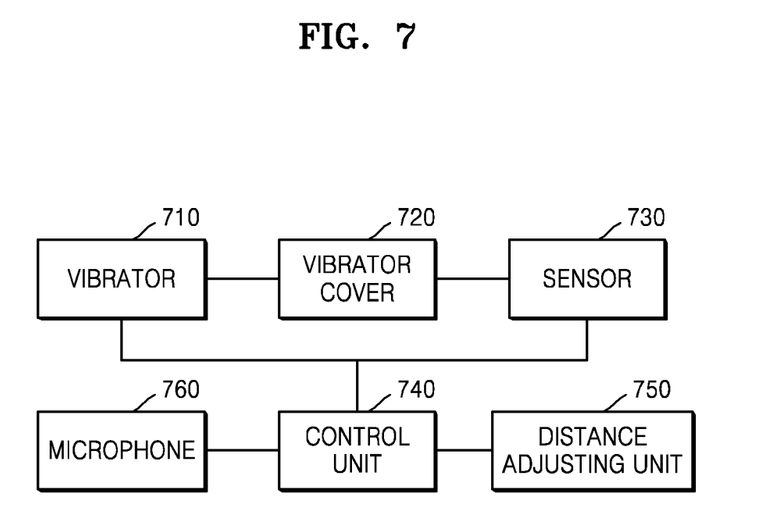
FIG. 7 is a block diagram illustrating an internal structure of a device for outputting an audio signal, according to an exemplary embodiment.

FIG. 7 is a block diagram illustrating an internal structure of a device 700 for outputting an audio signal, according to an exemplary embodiment.

Referring to FIG. 7, the device 700 may include a vibrator 710, a vibrator cover 720, a sensor 730, a control unit 740, a distance adjusting unit 750, and a microphone 760. The device 700 of FIG. 7 may correspond to the device 500 of FIG. 5 and may further include the microphone 760 in comparison with the device 500 of FIG. 5.

The microphone 760 may acquire an audio signal output by the vibrator 710. The control unit 740 may analyze the characteristic of the audio signal acquired by the microphone 760 and preprocess the audio signal of a current frame or adjust the distance based on a result of the analysis. By receiving the feedback about the audio signal by using the microphone 760, the control unit 740 may output the preprocessed audio signal or adjust the distance to optimally output the audio signal of the current frame. The microphone 760 may be configured to acquire the audio signal output by the vibrator 710 by contacting the skin surface.

The distance between the device 500 and the skin may change according to the movement of the user. When the distance between the device 500 and the skin changes, the sound quality and volume of the audio signal output by the vibrator 710 may change. Thus, by using the audio signal input by the microphone 760, the control unit 740 may preprocess the audio signal or adjust the distance so that the audio signal may be transmitted with the optimal sound quality and volume in real time to the user.

Also, for example, the sound quality, volume, and energy of the output audio signal of the input audio signal may vary according to the skin thickness, the skin state of the user, and the transmission path of the sound vibration. For example, since the conductivity of the sound vibration may change according to the state and type of the transmission medium for the sound vibration, the characteristics of the sound quality and volume of the audio signal transmitted to the user may change. For example, the skin thickness of a fat person and a thin person may vary according to the fat mass thereof. Thus, the sound vibrations transmitted to a fat person and a thin person may have different frequency band-dependent energy values even in the case of the same input audio signal. The device 500 may preprocess and output the audio signal so that the audio signal may be output with the characteristics similar to the characteristics of the input audio signal.

Figure 8:
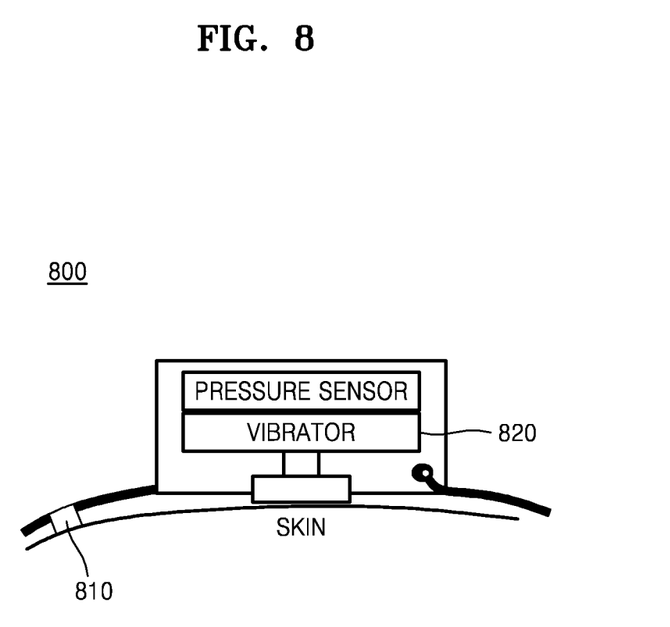
FIG. 8 is an exemplary diagram illustrating an example of a microphone according to an exemplary embodiment.

FIG. 8 is an exemplary diagram illustrating an example of a microphone according to an exemplary embodiment.

As illustrated in FIG. 8, a microphone 810 of a device 800 according to an exemplary embodiment may be provided at a strap of the device 800. An audio signal output by a vibrator 820 may be output in the form of a sound vibration that is transmitted through the skin surface and the skull instead of through the air. Thus, the microphone 810 provided at the strap may receive the audio signal output by the vibrator 820 through the skin surface of the user.

The microphone 810 may be provided at the strap as illustrated in FIG. 8, but is not limited thereto and may be provided at the body surface of the user that may receive the sound vibration.

Figure 9:
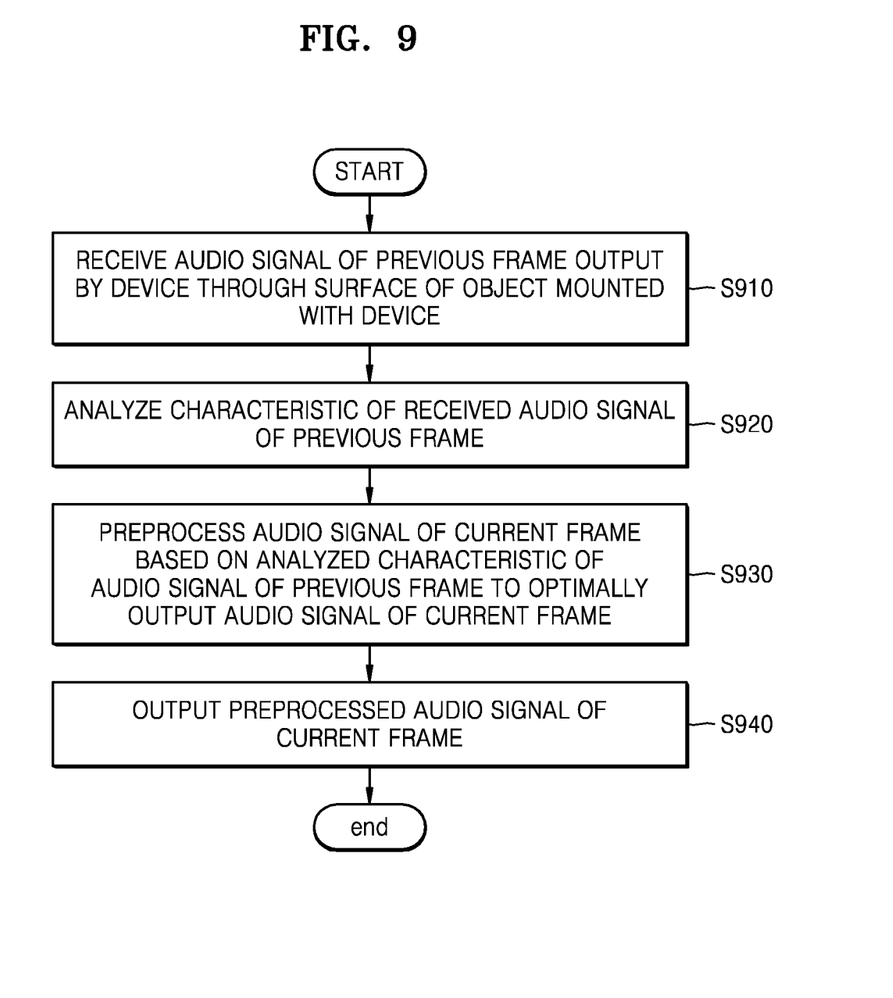
FIG. 9 is a flowchart illustrating a method for outputting an audio signal, according to an exemplary embodiment.

FIG. 9 is a flowchart illustrating a method for outputting an audio signal, according to an exemplary embodiment.

Referring to FIG. 9, in operation S910, the device 100 may receive the audio signal of a previous frame output by the device 100 through the surface of the object mounted with the device 100. The device 100 may receive the audio signal of the previous frame by a microphone that may receive the audio signal through the surface of the object. The object may include the body of the user hearing the audio signal. By analyzing the received audio signal of the previous frame, the device 100 may preprocess and output the audio signal of the current frame so that the audio signal of the current frame may be transmitted with the optimal sound quality and volume to the user.

The device 100 may receive and process the audio signal on a frame-by-frame basis, but is not limited thereto and may receive and process the audio signal on a various time unit-by-unit basis. Hereinafter, for convenience of description, it is assumed that the device 100 receives and processes the audio signal on a frame-by-frame basis.

In operation S920, the device 100 may analyze the characteristic of the audio signal of the previous frame received in operation S910.

For example, the device 100 may acquire the difference between the input audio signal and the received audio signal in order to analyze the characteristic of the received audio signal. The input audio signal may refer to the audio signal that is input to the vibrator 112 of the device 100, corresponding to the audio signal received by the microphone. The device 100 may obtain an energy spectrum of the input audio signal and the received audio signal in the frequency domain and acquire an energy value difference in each frequency band.

Also, for example, in addition to the energy value difference in each frequency band, the device 100 may acquire the difference value of the sound quality, tone, or volume between the input audio signal and the received audio signal.

The device 100 may acquire the difference between the input audio signal and the received audio signal as the characteristic of the audio signal of the previous frame.

As another example, the device 100 may acquire the characteristic of the audio signal, such as the sound quality, tone, or volume of the audio signal received by the microphone, as the characteristic of the audio signal of the previous frame. For example, the device 100 may predetermine a reference value about the sound quality, tone, or volume of the audio signal for each frequency band or each time point. The device 100 may obtain the signal characteristic such as the sound quality, tone, or volume of the received audio signal and acquire the difference value between the reference value and the value representing the characteristic of the audio signal as the characteristic of the audio signal of the previous frame.

In operation S930, the device 100 may preprocess the audio signal of the current frame based on the analyzed characteristic of the audio signal of the previous frame to optimally output the audio signal of the current frame.

For example, the device 100 may preprocess the audio signal of the current frame according to a difference value from the reference value or the input audio signal of the audio signal of the previous frame. The device 100 may preprocess the audio signal of the current frame by correcting the audio signal of the current frame by the difference value. When correcting the volume of the audio signal, the device 100 may correct the audio signal of the current frame by the difference value of the volume for each frequency band or each time point. When the energy value of the audio signal of the previous frame is smaller than the reference value or the energy value of the input audio signal in a predetermined frequency band, the device 100 may process the audio signal of the current frame so that the energy value of the audio signal of the current frame may increase by the difference value in the predetermined frequency band.

In operation S940, the device 100 may output the audio signal preprocessed in operation S930 through the vibrator. Through the preprocessing process, the output audio signal may approach the input audio signal. Thus, the user may hear the output audio signal (i.e., the sound vibration) with the minimized sound change depending on the change in the distance between the device 100 and the user's skin or the state of the transmission medium of the sound vibration.

According to an exemplary embodiment, the audio signal output as the sound vibration may be transmitted with the optimal sound quality and volume to the user.

The methods according to the exemplary embodiments may be stored in a non-transitory computer-readable recording medium by being implemented in the form of program commands that may be performed by various computer means. The non-transitory computer-readable recording medium may include program commands, data files, and data structures either alone or in combination. The program commands may be those that are especially designed and configured for the inventive concept, or may be those that are publicly known and available to those of ordinary skill in the art. Examples of the non-transitory computer-readable recording medium may include magnetic recording mediums such as hard disks, floppy disks, and magnetic tapes, optical recording mediums such as compact disk-read only memories (CD-ROMs) and digital versatile disks (DVDs), magneto-optical recording mediums such as floptical disks, and hardware devices such as read-only memories (ROMs), random-access memories (RAMs) and flash memories that are especially configured to store and execute program commands. Examples of the program commands may include machine language codes created by a compiler, and high-level language codes that may be executed by a computer by using an interpreter.

While the inventive concept has been particularly shown and described with reference to exemplary embodiments thereof, those of ordinary skill in the art will understand that various deletions, substitutions, or changes in form and details may be made therein without departing from the scope of the inventive concept as defined by the following claims. Thus, the scope of the inventive concept will be defined not by the above detailed descriptions but by the appended claims. All modifications within the equivalent scope of the claims will be construed as being included in the scope of the inventive concept.

The invention claimed is:

1. A wearable device for transmitting a vibration to a body of a user, the wearable device comprising:
   a strap surrounding the body of the user wearing the wearable device; and
   an output unit comprising a vibrator located at an inside surface of the strap to generate a vibration based on an audio signal to be output by the wearable device, a vibrator cover arranged to contact a surface of the vibrator facing the body and transmit the vibration generated by the vibrator to the body, and a vibrator support arranged to contact an opposite surface opposite to the surface of the vibrator facing the body and restrict transmission of the vibration generated by the vibrator to outside of the wearable device via the strap,
   wherein the vibrator cover surrounds at least one surface of the vibrator, and
   wherein an area of a surface of the vibrator support contacting the vibrator is smaller than an area of a surface of the vibrator support opposite to the surface of the vibrator support contacting the vibrator.

2. The wearable device of claim 1, wherein the vibrator cover contacts the body of the user.

3. The wearable device of claim 1, the wearable device further comprising:
   a processor configured to:
   analyze a characteristic of the audio signal output by the vibrator,
   preprocess another audio signal to be output by the vibrator based on analyzing the characteristic of the audio signal output by the vibrator, and
   output the preprocessed audio signal.

4. The wearable device of claim 3, further comprising a support cover surrounding at least one surface of the vibrator support,
   wherein the vibrator support is arranged between the vibrator and the vibrator cover.

5. The wearable device of claim 4, wherein as the support cover and the vibrator cover are adhered to each other, the vibrator and the vibrator support are arranged in a space formed by the support cover and the vibrator cover adhered to each other.

6. The wearable device of claim 3, further comprising:
   a microphone configured to acquire the audio signal caused by the vibration generated by the vibrator,
   wherein the processor is further configured to process the other audio signal input to the wearable device based on the audio signal acquired by the microphone, and
   wherein the processor generates a vibration by controlling the vibrator based on the processed audio signal.

7. The wearable device of claim 6, wherein the processor analyzes a signal characteristic of the audio signal acquired by the microphone and processes a current frame of the audio signal input to the wearable device based on a result of the analyzing.

8. The wearable device of claim 6, wherein the processor processes a current frame of the audio signal input to the wearable device based on a medium characteristic of the body of the user.

9. The wearable device of claim 6, wherein the processor processes a current frame of the audio signal input to the wearable device by adjusting an energy value of the audio signal of the current frame in a predetermined frequency band.

10. The wearable device of claim 3, wherein the processor is further configured to adjust a distance between the vibrator cover and a skin surface of the user based on a pressure between the skin surface of the user and the wearable device.

11. The wearable device of claim 3, wherein the processor is further configured to preprocess the other audio signal based on a pressure between a skin surface of the user and the wearable device.

12. The wearable device of claim 3, wherein the processor is further configured to adjust a distance between a skin surface of the user and the wearable device based on the characteristic of the audio signal output by the vibrator.

13. The wearable device of claim 3, wherein the processor is further configured to:
   obtain a volume of the audio signal output by the vibrator,
   acquire a difference value between the volume of the audio signal and a predetermined reference value, and
   preprocess the other audio signal based on the difference value.

14. The wearable device of claim 3, wherein the vibrator support includes a shape of a cone.

15. The wearable device of claim 3, wherein the processor is further configured to adjust the strap based on the audio signal output by the vibrator.

16. The wearable device of claim 1, wherein the vibration generated by the vibrator is transmitted from a first portion to a second portion in the body.

* * * * *